Sept. 19, 1967 B. I. BERTELSEN 3,343,145

DIFFUSED THIN FILM MEMORY DEVICE

Filed Dec. 24, 1962

INVENTOR
BRUCE I. BERTELSEN

BY J W Armbruster
ATTORNEY

United States Patent Office 3,343,145
Patented Sept. 19, 1967

3,343,145

DIFFUSED THIN FILM MEMORY DEVICE

Bruce I. Bertelsen, Poughkeepsie, N.Y., assignor to International Business Machines Corporation, New York, N.Y., a corporation of New York Filed Dec. 24, 1962, Ser. No. 246,834
10 Claims. (Cl. 340—174)

This invention relates in general to production of a magnetic thin film memory array and more particularly to a diffusion process for separating thin film elements by electron beam diffusion of nonmagnetic alloy separations between discrete magnetic storage elements.

Heretofore producion of vacuum deposited, sputtered or plated thin film memory devices required the removal of an array plane from a vacuum chamber or other primary coating device in order to etch or otherwise define separations between adjacent discreet memory film elements. Masking of magnetic film areas is another procedure of the prior art which is avoided in the present instance by effecting all coatings or deposiions and memory element separations in the same vacuum chamber.

An object of the invention is the production of a thin film memory array by the diffusion of lines or areas of copper or chromium alloyed with nickel iron as nonmagnetic separations between magnetic elements of a memory array.

Another object of the invention is the use of a multidirectional electron beam for diffusing alloy separations between memory elements.

Another object of the invention is the provision of an economical form of array processing device for producing thin film memory array structures in one continuous process with little or no manipulation or handling between film treatment steps.

Another object of the invention is the provision of devices for producing an array of discreet memory elements in one continuous process in a vacuum chamber without removal of the memory plane from the chamber. A three dimensional buildup of multilayered planes is also possible by repetition of the steps for one plane.

Another object of the invention is the provision of a memory device of the miniaturized variety involving small thin planar memory elements arranged in one plane wherein multilayer elements are possible with tighter coupling of the sense winding lines with respect to the other windings.

A further object of this invention is to provide means for forming alloy grids, or encircling demarcations or demagnetized boundary lines isolating nickel iron magnetic thin film memory elements. A thin film of chromium is to be alloyed locally with the nickel iron film and depress the Curie point of the chromium nickel iron alloy lines below room temperature. The Curie point of a substance is defined as the temperature above which the magnetic substance loses its magnetic properties. Since only 20–30% chromium in a nickel iron chromium alloy is required to depress the Curie point below room temperature, heat of diffusion of composite thin films need not be high and the fast application of a minute moving electron beam is sufficient to effect rapidly traced demarcations of demagnetized lines between the many small memory elements of a thin film memory array.

The foregoing and other objects, features and advantages of the invention will be apparent from the following more particular description of a preferred embodiment of the invention, as illustrated in the accompanying drawings.

Although the mode of control may vary as to the different methods of placing successive films of magnetic and other films on the different layers of the memory substrate, a selected way of illustrating the invention is with the vacuum deposition process in mind. Under such conditions the substrate may first receive a preliminary smoothing layer of some ceramic and then have the usual nickel iron coating deposited in one continuous film which is to perform the magnetic storage effects. Of course, in order to provide a plurality of separate bit storage elements it is necessary to divide this single large film into separate discreet elements. This is usually done by some etching or abrading method, but in the present instance the process is to provide a preliminary coating of chromium and then to so heat discreet lines or areas of this chromium so as to diffuse it into and betwen the separate unaffected magnetic areas and thus produce encircling nonmagnetic areas around each memory element. The heating of the chromium in a discreet area is effected by electron beam action which may be accurately controlled and limited to very fine lines which enhance the ability to provide a great many separate elements of very small area. In other words, a miniaturization of the memory plane is possible because of the fine line technique obtained through use of the electron beam action.

A number of economical advantages flow from use of the present procedure. The one is that a whole array of discreet memory elements may be formed without removal of their support from the vacuum and without the use of masks. Another advantage resulting from use of the present process is the elimination of surface discontinuities which sometimes occur when etching or masking methods are used to isolate many magnetic thin film areas of an array. This is especially true when it is desired to miniaturize the array by having the high density elements made very small and separated by fine lines measured in mils or microns. Without discontinuities of level, division by diffusion prevents magnetic interaction by domain wall creeping. Since the substrate need not be removed from a vacuum chamber, the number of films applied before and after the application of the nickel iron and chromium layers do not add appreciatively to the final cost. In this way a protective coating such as one of silicon monoxide on the outer face may be thought of as a by-product of the novel method. Although illustrated as involving only one succession of layers, it will be appreciated that while the substrate is in the vacuum chamber a succession of series of layers of magnetic, nonmagnetic, nonconductive and conductive materials may be superimposed to provide closed flux path elements or magnetic elements and all of their necessary drive and sense wiring.

Figures 1, 2:
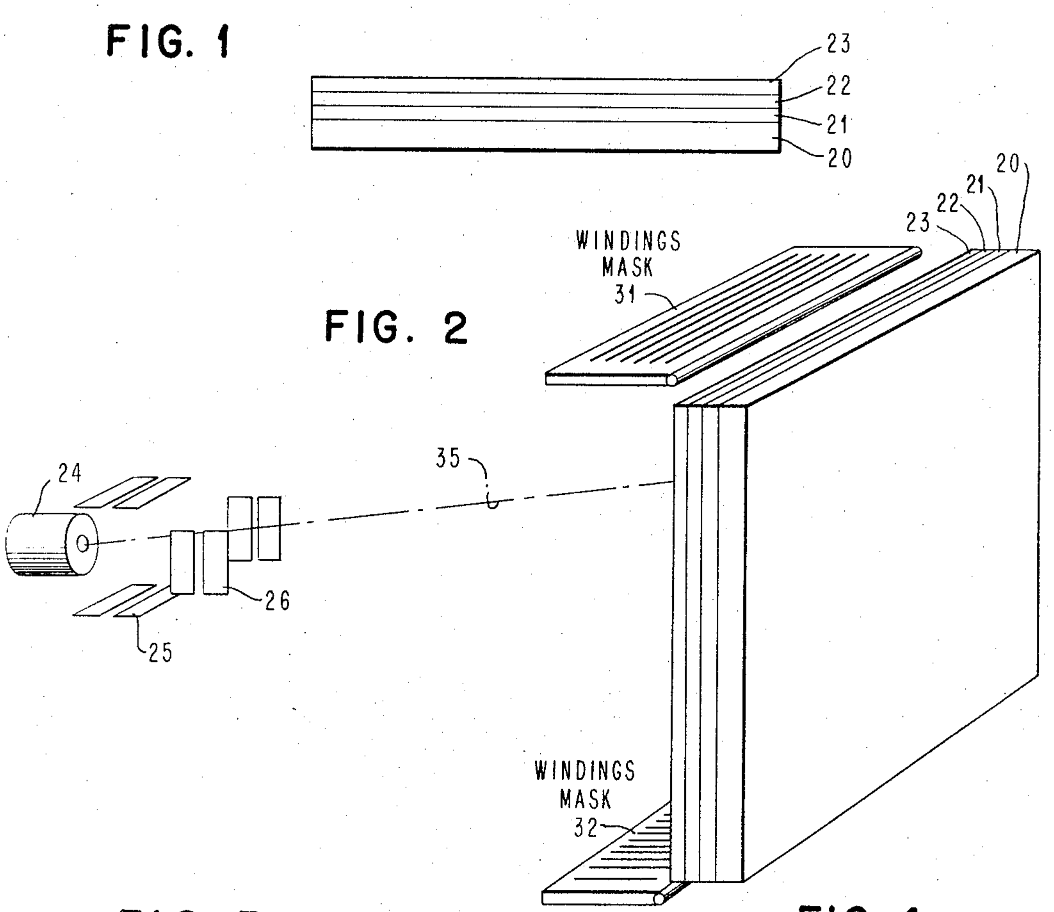
FIG. 1 is a sectional view showing a substrate with the films of the memory element array before the diffusion process.
FIG. 2 is a perspective view showing the memory substrate arranged in a vacuum chamber and in position opposite an electron gun which directs a beam to divide the magnetic coating into horizontal and vertical sections as the beam operates on the outer chromium layer to diffuse it into the magnetic layer and alloy separations horizontally and vertically.

FIG. 1 is an enlarged sectional showing of a substrate when prepared before application of the diffusing heat such as that of an eletcron beam. The substrate 20 is to be of a metal such as silver, silver alloys, copper, aluminum or other highly conductive material, or a ceramic such as glass or any of the high temperature resistant plastics coated with one of the metals or alloys noted. A preliminary coating 21 is a thin film of silicon monoxide deposited to provide an even finish or smooth underlying layer for the reception of the nickel iron thin film deposit 22 which is applied by vacuum deposition as the preferred method, but it may very well be applied by cathode sputtering, electroplating, electroless chemical deposition or any other of the several well known methods of providing oriented deposits of ferromagnetic material. Over the nickel iron layer it is proposed that a thin film 23 of copper or chromium be applied also in any of the several well known methods of application but preferably by vacuum deposition in order that a continuous series of operations may be performed in the one vacuum and beam directing chamber. When multiple arrays are superimposed, shielding is by intermediate layers of highly conductive metal.

FIG. 2 illustrates how such a vacuum chamber may be provided with electron beam apparatus for locally affecting the chrominum layer to diffuse part of it into the nickel iron and thereby form a series of boundaries such as horizontal and vertical lines separating the nickel iron film into square or rectangular elements each of which is adapted to store a switchable state of magnetic flux as affected by the usual windings for writing, sensing, reading and inhibiting actions. The beam generating apparatus includes the usual electron gun 24 and the series of deflection plates including the vertical plates 25 and the horizontal plates 26 which are seated between the gun and the substrate 20 which is faced in the direction wherein the chromium film 23 is facing the gun so that a sweeping beam 35 may be rapidly directed horizontally and vertically across the face of the substrate.

When the coated substrate 20, FIG. 2 is set up as an anode in the vacuum deposition chamber or optionally in a separate CR tube-like device, a focused electron beam 35 will heat the films in those areas where the electrons impinge as a thin penciled line in a sweeping pattern. Since the dissipation energy of the electron beam may be made high enough to elevate the film temperature locally to a suitable migration temperature, the areas or encircling lines of the coated magnetic film heated and alloyed by the electron beam will become permanently nonmagnetic.

Although only one electron gun 24 is shown for purposes of illustration, it is evident that one or more lines or sets of guns and series of beams 35 can be employed simultaneously to define a series of grid lines on a passing substrate in one pass, and an intersecting series of beams by the same or another set of guns could establish horizontal and vertical lines separations of memory areas.

It will be understood that the timing of the application of the beam is controlled or programmed so that depositions of the silicon monoxide, the nickel iron and the chromium are programmed to follow in sequence before the application of the electron beam for diffusion before the other steps which are about to be explained in connection with FIGS. 3 to 5.

Figure 3:
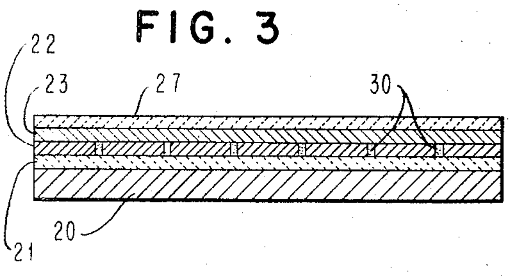
FIG. 3 is a sectional elevation view taken through the memory plane after the diffusion process has taken place and after an outer film of silicon monoxide has been deposited on the outer face.

In FIG. 3 it is noted that the memory plane differs in two respects from the showing in FIG. 1. The one difference resides in the small webs or lines of separation 30 in the nickel iron layer 22. These are the diffused alloy separations 30 which are nonmagnetic and formed as divisions for the other areas of magnetic film retaining the magnetic properties. The other difference is the second coating 27 of silicon monoxide which is to be applied over the chrominum in preparation for conductive material which is to form the windings for reading and writing by switching the magnetic flux storage state of the different thin film areas.

Figure 4:
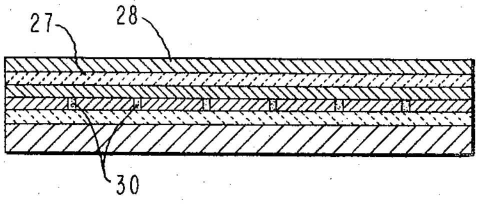
FIG. 4 is a still later sectional elevation view taken after the outer coating of silicon monoxide has received a coating of copper which is to be etched in a pattern to form the windings for control of the magnetic switching of the elements of the array. As an alternative step, the copper windings may be masked and vacuum deposited directly to eliminate the etching operation.
Figure 5:
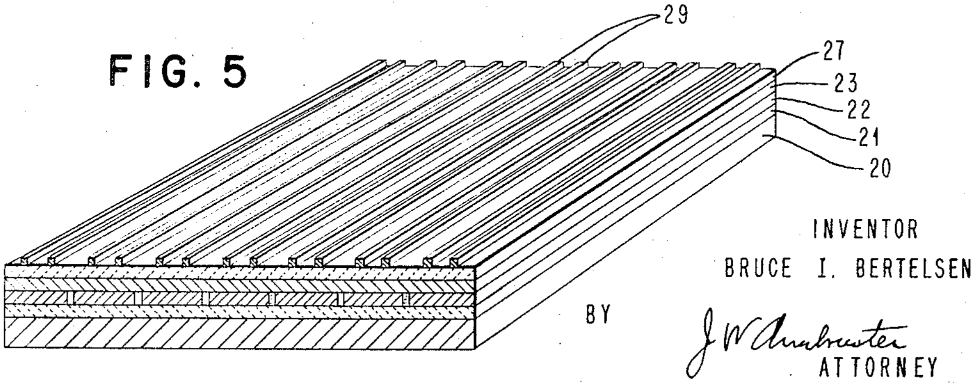
FIG. 5 is a sectional elevation view of a memory plane complete with windings and showing the outer copper etched into a pattern of conductive lines which are read and write control windings for the memory elements which are directly beneath the windings and only separated therefrom by a thin film of silicon monoxide.

After the vacuum evaporation of the silicon monoxide 27, another layer 28 of copper is deposited on the substrate as noted in FIG. 4. This provides the material which may be etched or otherwise separated into the separate winding lines 29 as shown in FIG. 5. It is evident that in lieu of etching lines 29 a masking process may be used for delineating such winding lines directly in the same vacuum chamber wherein all the other films are deposited, and in such an event, the process of the layers 21 to 29 may be duplicated repetitively to provide a three dimensional storage structure in one continuous operation.

In order to furnish more definite parameters associated with the process the steps of the process may again be reviewed along with a number of figures found effective.

A polished metallic substrate is first coated with a 1–1.5 micron layer of SiO for surface leveling. Without breaking vacuum, a layer of NiFe (81%, 19%), 500–1000 angstroms thick is then deposited from a second evaporation source. Instead of then removing the substrate to create discreet elements NiFe by photoetching techniques as is sometimes done, the continuous NiFe layer is now coated with chromium (200–1000 angstroms) from a third evaporation source. By moving the substrate over an electron beam 35 of appropriate energy and dimensions, the chromium can be caused to diffuse into the NiFe in a pattern corresponding to that of the desired magnetically dead regions. Since only 20–30% Cr in the NiFeCr alloy is required to depress the Curie point below room temperature, the duration of application and magnitude of energy required is not excessive. It is sufficient that required exposure to a 0.3 mm., 2 kv., 100 $\mu$a. electron beam would be less than a millisecond to heat the film (100 A. NiFe, 500 A. Cr) to 1000° C. and allow complete migration of Cr through the NiFe film. A total of $1.7\times10^4$ beam diameters of motion is required in a 5 x 5 cm., 2304 bit (0.3 x 0.65 mm. bits). Thus, the exposure time required is of the order of 20 seconds utilizing a single beam source. This time is compatible with the deposition process steps but parallel beams would be relatively simple to provide and would diminish registration and complexity of feeding mechanism problems as well as reduce treatment time.

In the specific application previously mentioned, the next steps would then be to deposit another SiO layer and finally either a thin conductive layer for subsequent electroplating and etching into the sense line pattern or vacuum deposit to full thickness with masking or without and removal for photoetching. The additional layers are applied at very low cost in this manner—by simply exposing to another source without breaking the vacuum.

While masking of high density memory element area per se is not recommended for high temperature applications, it is possible to use optional masks for windings, conductors such as masks 31 and 32 which may be used over the substrate face when copper is being evaporated to deposit the winding lines such as lines 29.

It may be recognized that variations of the specifics described here are possible. For example:

Other materials such as copper may be substituted for the chromium impurity. Like chromium, it may be readily evaporated, it diffuses under influence of heat, depresses Curie point of NiFe and has a negligible diffusion rate at memory operating temperatures which are usually near room temperature.

Other methods of heating may be used, such as radiation, ion bombardment or conduction.

Chemical reaction may be utilized as well as alloying to cause the room temperature permeability to approach unity. If a relatively stable compound, e.g., magnesium fluoride is substituted for the Cr, the very high temperature possible in this method will cause breakdown and reaction between some of the free fluorine and iron and nickel. The nonmagnetic fluorides will act in the same fashion as the aforementioned chromium and copper alloys in creating a dead demagnetized region between memory elements.

Although illustrated with the chromium film 23 deposited over the nickel iron film 22, it is possible to reverse the position of these films and put the chromium under the nickel iron and the films will still be subject to the diffusing action by localized heating as noted hereinbefore.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A vacuum metallized magnetic memory device comprising:
  a heat resistant substrate,
  a film of silicon monoxide deposited thereon,
  a film of ferromagnetic material deposited on said silicon monoxide,
  a film of a Period Four metal deposited on said ferromagnetic material,
  alloy lines in the two last mentioned films formed by electron beam diffusion in vacuum and arranged in a pattern of demagnetized lines to define discrete memory elements of said ferromagnetic film,
  a second film of silicon monoxide deposited on said memory elements,
  a film of copper deposited in masked winding control lines over said memory elements,
  and a protective film of a ceramic over said winding lines.

2. A three dimensional multilayered memory device according to claim 1 wherein the structural film arrangement set forth is repeated a plurality of times to produce superimposed memory elements.

3. A magnetic storage device comprising:
  an imperforate thin film of magnetic material of a thickness in the order of 500–1,000 angstroms,
  an overall thin film of Period Four material of a thickness in the order of 200–1,000 angstroms deposited on said magnetic material, and
  a pattern of thin alloy lines in said films, said films being alloyed together in said pattern defining micron sized discrete areas of unalloyed magnetic material separated by said pattern lines of alloyed films.

4. A magnetic memory storage device comprising:
  a thin film of ferromagnetic material of a thickness in the order of 500–1,000 angstroms,
  a continuous imperforate thin film of Period Four metal of a thickness in the order of 200–1,000 angstroms deposited on said ferromagnetic material, and
  alloy lines in a pattern in said films formed rapidly in thin penciled lines by sweeping electron beam diffusion, said films being alloyed together in one or more encircling lines of said pattern to define discrete areas of unalloyed ferromagnetic memory material.

5. A magnetic storage device comprising:
  a layer of magnetic material, a coating of chromium on said magnetic material,
  said chromium being diffused into said magnetic material in a plurality of area enclosing lines, said lines being of width in the micron range to define discrete multimicron areas of undiffused magnetic material.

6. A magnetic thin film memory device comprising:
  a substrate of nonmagnetic material,
  a thin film of ferromagnetic material of a thickness in the order of 500–1,000 angstroms deposited on said substrate,
  a continuous thin film of Period Four metal of a thickness in the order of 200–1,000 angstroms deposited on said ferromagnetic material, and
  alloy lines in the two said films, said lines being in an orthogonal pattern and of widths of a micron size, said films being alloyed by a rapidly applied pattern of heat in said lines of finely penciled distinct separation areas to be demagnetized and define discrete unalloyed areas of magnetizable ferromagnetic memory film.

7. A device of the kind set forth in claim 6 including:
  a coating of silicon monoxide,
  and conductive control windings formed on said silicon monoxide to cooperate with said discrete memory areas.

8. A magnetic thin film memory plane comprising:
  a substrate of metal,
  a film of silicon monoxide deposited on a face of said substrate,
  a thin film of nickel-iron deposited on said silicon monoxide,
  a thin film of chromium deposited on said nickel-iron,
  and a pattern of lines of alloy areas in said films, said lines being in the order of a micron in width and wherein said chromium is alloyed with the nickel-iron to form permanently demagnetized separation line areas defining separate bistable magnetizable memory film elements.

9. A magnetic thin film memory device comprising:
  a substrate of nonferrous metal,
  a thin film of chromium of a thickness in the order of 200–1,000 angstroms on said substrate,
  and a thin film of ferromagnetic material of a thickness in the order of 500–1,000 angstroms on said chromium, and
  alloy lines in an orthogonal pattern in said films with said chromium being diffused into the overlying ferromagnetic film in distinct separation alloy lines which are permanently demagnetized and form minute boundaries of unalloyed areas of a size in the order of several microns of magnetic flux storing ferromagnetic film.

10. A magnetic storage device comprising:
  a layer of magnetic material,
  a coating of magnesium fluoride on said magnetic material, and
  alloy lines in a pattern in said layer with said magnesium fluoride being diffused into said magnetic material in a plurality of microscopic area enclosing lines to define discrete areas of undiffused magnetic material.

References Cited

UNITED STATES PATENTS

| | | | |
|---|---|---|---|
| 3,080,481 | 3/1963 | Robinson ---------- | 29—155.5 |
| 3,161,946 | 12/1964 | Birkenbeil --------- | 29—155.5 |

BERNARD KONICK, *Primary Examiner.*

S. M. URYNOWICZ, *Assistant Examiner.*